United States Patent [19]

Purves et al.

[11] Patent Number: 4,654,221
[45] Date of Patent: Mar. 31, 1987

[54] ANTI-STICKING COMPOSITIONS

[75] Inventors: Edward R. Purves; Robert F. Thomas, both of Cincinnati, Ohio

[73] Assignee: The Procter & Gamble Company, Cincinnati, Ohio

[21] Appl. No.: 814,061

[22] Filed: Dec. 18, 1985

Related U.S. Application Data

[63] Continuation of Ser. No. 595,193, Mar. 30, 1984, abandoned.

[51] Int. Cl.$^4$ .......................... A23D 5/00; A23L 1/01
[52] U.S. Cl. .................................... 426/609; 426/523; 426/811
[58] Field of Search ............... 426/601, 609, 640, 811, 426/523

[56] References Cited

U.S. PATENT DOCUMENTS

| | | | |
|---|---|---|---|
| 1,982,186 | 11/1934 | Working | 99/13 |
| 2,629,662 | 2/1953 | Julian et al. | 99/15 |
| 3,355,302 | 11/1967 | Purves et al. | 99/163 |
| 3,399,063 | 8/1968 | Schwall et al. | 99/107 |
| 3,896,975 | 7/1975 | Follmer | 222/192 |
| 4,142,003 | 2/1979 | Sejpal | 426/601 |
| 4,155,770 | 5/1979 | Doumani | 106/267 |
| 4,163,676 | 8/1979 | Konigsbacher | 106/243 |
| 4,188,412 | 2/1980 | Sejpal | 426/609 |
| 4,192,898 | 3/1980 | Hanson, Sr. | 426/609 X |
| 4,211,802 | 7/1980 | Carey | 426/609 |

FOREIGN PATENT DOCUMENTS

| | | | |
|---|---|---|---|
| 91910 | 8/1978 | Japan . | |
| 107908 | 8/1979 | Japan | 426/609 |
| 107530 | 8/1979 | Japan . | |
| 110210 | 8/1979 | Japan . | |
| 124009 | 9/1979 | Japan . | |
| 112825 | 9/1979 | Japan . | |
| 127907 | 10/1979 | Japan . | |
| 126206 | 10/1979 | Japan . | |
| 127408 | 10/1979 | Japan . | |

OTHER PUBLICATIONS

Toy, A.D.F., *The Chemistry of Phosphorus*, Pergamon Press, New York, NY (1975), pp. 468-529.

Bailey's Industrial Oil and Fat Products, D. Swern, Ed., interscience Publishers, New York, NY (1964), pp. 731-733.

Andres, C., Ed., "Heat Stable Lecithin", *Food Processing*, Nov. 1983, pp. 68-69.

*Primary Examiner*—Robert Yoncoskie
*Attorney, Agent, or Firm*—Eric W. Guttag; Rose Ann Dabek; Richard C. Witte

[57] ABSTRACT

This invention relates to an anti-sticking additive for cooking fats comprising a salt of an oxyacid of phosphorus, or mixtures thereof. The salts are of the formula MX, wherein M comprises an alkali metal, alkali earth metal, mixed alkali-other metal, or ammonium, and X comprises a hypophosphate, orthophosphate, pyrophosphate, polyphosphate, metaphosphate, or other similar anions. The cooking fat composition containing such a salt resists thermal darkening and off-flavor development during use. A method for reducing sticking of food during cooking comprises cooking with a fat composition containing a salt of an oxyacid of phosphorus, or mixtures thereof, as an anti-sticking agent.

25 Claims, No Drawings

ANTI-STICKING COMPOSITIONS

This is a continuation of application Ser. No. 595,193, filed on 3/30/84, now abandoned.

TECHNICAL FIELD

The present invention relates to a method for reducing sticking of foods during cooking through the use of a fat composition containing an anti-sticking agent. More particularly, this invention relates to an anti-sticking additive for cooking fats comprising a salt of an oxyacid of phosphorus, preferably a phosphate salt, or mixtures thereof.

BACKGROUND OF THE INVENTION

During cooking of foods on a hot surface the food often sticks to the surface. Cooking fats are employed to coat the surface as an aid in eliminating such sticking. Two performance problems of currently available cooking fats are the development of a dark brown color and development of off-flavors if the fat is held too long on the heated surface. These are caused by the presence of lecithin which is commonly added to cooking fats as an anti-sticking agent. Lecithin aids in decreasing food sticking but the amount which can be used in the cooking fat is limited due to the color development and off-flavor development. Fats containing a higher than normal level of lecithin to enhance the anti-sticking properties darken and develop off flavors more quickly.

Despite its disadvantages, lecithin is widely used as an anti-sticking agent in cooking fats. For example, see the following patents disclosing fat-based cookware surface sprays containing lecithin as an anti-sticking agent: U.S. Pat. No. 3,896,975 of Follmer, issued July 29, 1975; U.S. Pat. No. 4,142,003 of Sejpal, issued Feb. 27, 1979; U.S. Pat. No. 4,155,770 of Doumani, issued May 22, 1979; U.S. Pat. No. 4,163,676 of Konigsbacker, issued Aug. 7, 1979; and U.S. Pat. No. 4,188,412 of Sejpal, issued Feb. 12, 1980.

Several fat or oil additives are known for inhibiting darkening of phospholipids such as lecithin upon heating. These additives are primarily acidic or weakly basic compounds such as amino acid salts, carboxylic acids and derivatives, or salts of carbonates or bicarbonates. Inhibition of discoloration of phospholipids in fatty oils during heating can be achieved by the addition to the oil of a mixture of an acidic amino acid salt and a basic amino acid salt chosen from salts of arginine and glutamic acids, lysine and glutamic acids, or lysine and aspartic acid. In addition, sodium glutaminate, acidic anhydride, or alkali metal acetate can be employed.

Pretreatment of lecithin to prevent thermal browning in heated fat compositions is taught by Japan Pat. No. 54,400, issued Apr. 21, 1980. The pretreatment comprises heating the lecithin in an inert atmosphere either alone or diluted with a fat at 150° C. to 230° C. (302° F. to 446° F.) for 5 minutes to 1 hour.

Japan Pat. No. 91,910, issued Aug. 12, 1978, discloses the stabilization of vegetable oil fatty acid monoglyceride quality by the addition of 0.001 to 0.1% by weight of disodium phosphate, trisodium phosphate, dipotassium phosphate, and/or tripotassium phosphate. The oxidation of carotene and tocopherols present in slight amounts is depressed to prevent coloration. Soybean, palm, cottonseed and coconut oil are specified as examples of suitable vegetable oils. The phosphates are added with stirring as an aqueous solution to the oil heated to 80° to 100° C. Solvents such as propylene glycol, sorbitol, or glycerin, are employed to assure uniformity of the mixture.

U.S. Pat. No. 3,355,302 of Purves et al., issued Nov. 28, 1967, discloses a plastic shortening suitable for frying and baking containing 0.2% to 1.0% by weight of a $C_{12}$ to $C_{22}$ fatty acid monoester of polyoxyethylene sorbitan containing an average of about 20 oxyethylene units per molecule. The fatty acid monoester is preferably acid treated and/or the shortening contains about 0.01% to 0.25% by weight of an oil-insoluble water-soluble salt of phosphoric acid. Suitable salts include: sodium metaphosphate; sodium phosphate, dibasic, hexahydrate; tetrapotassium pyrophosphate, anhydrous; tetrasodium pyrophosphate, decahydrate; sodium phosphate tribasic; sodium phosphate, monobasic; sodium glycerophosphate; sodium phosphate, dibasic, anhydrous; Graham's salt; and sodium hexametaphosphate having an average of 14 metaphosphate monomer units per molecule. The salts of phosphoric acid are employed specifically to reduce spatter and to aid in improving temperature recoverability of the shortening during frying.

These references disclose fat and shortening compositions containing phosphate salts as an anti-spattering agent and to suppress color development, but not that phosphate salts are effective as an anti-sticking agent and can be used as a substitute for lecithin. Eliminating the use of lecithin as a component of cooking fat compositions eliminates the resulting problems of thermal browning and off-flavor development when the fat is used in frying or grilling.

Accordingly, it is an object of the present invention to provide a novel anti-sticking agent for use in cooking fats.

It is a further object of the present invention to provide fat compositions having effective anti-sticking properties in the absence of lecithin.

It is a further object of the present invention to provide fat compositions having effective anti-sticking properties in the presence of reduced levels of lecithin.

It is a further object of the present invention to provide fat compositions containing an anti-sticking agent with improved color and flavor during use.

It is a further object of the present invention to provide a novel process for reducing sticking of food during cooking.

These and other objects of the invention will be evident from the following disclosure.

DISCLOSURE OF THE INVENTION

A new anti-sticking agent for use in cooking fats has been discovered comprising salts of the oxyacids of phosphorus, preferably phosphate salts. An improved cooking fat composition containing such a salt, or mixtures thereof, resists the thermal darkening and off-flavor development normally associated with the use of lecithin as an anti-sticking agent. When lecithin is omitted, a cooking fat with improved color and flavor during use results. The salt can also be used in the presence of lecithin or reduced levels of lecithin, with color and off-flavor development retarded in proportion to the lecithin reduction. Salts useful herein include those of the form MX wherein M comprises an alkali metal, alkali earth metal, mixed alkali-other metal, or ammonium, and X comprises primarily an hypophosphate, orthophosphate, pyrophosphate, polyphosphate, metaphosphate or other similar anions.

The fat composition of the present invention comprises primarily triglycerides having saturated or unsaturated $C_{12}$ to $C_{22}$ fatty acid moieties, preferably containing a suspension of particulate triglyceride hardstock. The salt is present at a level of at least about 0.001% by weight of the composition, preferably at a level of from about 0.01% to about 0.5% by weight of the composition.

Additionally, this invention comprises a method for reducing sticking of food during cooking by cooking with a fat composition containing a salt of an oxyacid of phosphorus, or mixtures thereof, as an anti-sticking agent.

DESCRIPTION OF PREFERRED EMBODIMENT

This invention comprises a novel anti-sticking agent for use in cooking fats, in particular, frying and grilling fats. It has been found that salts of the oxyacids of phosphorus, preferably phosphate salts, or mixtures thereof, are effective as anti-sticking agents in cooking fats. Elimination of lecithin as an anti-sticking agent results in an improved cooking fat which resists off-flavor development and thermal darkening. The salts can also be used in the presence of lecithin or reduced levels of lecithin, with color and off-flavor development retarded in proportion to the lecithin reduction.

The term "lecithin" as used herein is defined as commercial lecithin, typically containing about 60% of three major phospholipids, i.e., phosphatidyl choline, phosphatidyl ethanolamine, and phosphatidyl inositide, about 5% to 7% oligosaccharides, and about 33% to 35% oil.

Fats suitable for use in the present invention include all edible fats or oils which are solid, plastic, liquid or fluid, i.e., pourable or fluid when heated to temperatures normally encountered in cooking operations of from about 200° F. (93° C.) to about 500° F. (260° C.). The fats typically comprise triglycerides having $C_{12}$ to $C_{22}$ fatty acid moieties. The cooking fat compositions of the present invention comprise up to about 99.999% by weight triglycerides. These materials can be derived from plants or animals or can be edible synthetic fats or oils. Animal fats such as lard, tallow, oleo oil, oleo stock, oleo stearin, and the like, can be used. Also, liquid oils such as unsaturated oils, or liquid oils converted into plastic fats by partial hydrogenation of the unsaturated double bonds of the fatty acid constituents, or by proper mixture with a sufficient amount of solid triglycerides, are suitable.

Preferred fats are fluid fats having a sufficiently low content of triglycerides of melting point higher than about 60° F. (16° C.), as to provide upon cooling of the composition from about 100° F. (38° C.) to about 60° F. (16° C.), an increase in the amount of solids of not more than about 20%. Such fats are fully pourable at room temperature. Liquid glycerides useful herein comprise primarily triglycerides having $C_{12}$ to $C_{22}$ fatty acid moieties which can be saturated or unsaturated. They can be derived from any of the naturally occurring glyceride oils such as soybean oil, cottonseed oil, peanut oil, rapeseed oil, sesame seed oil, sunflower seed oil, and the like. Also suitable are liquid oil fractions obtained from palm oil, lard and tallow, as for example by graining or directed interesterification followed by separation of the oil.

The fluid fat preferably includes triglycerides having acyl groups predominantly in the range of from 16 to 22 carbon atoms and having a polyunsaturated character. Preferred polyunsaturated triglycerides include those derived from soybean, cottonseed, peanut, safflower and sunflower seeds. The preferred fluid fat contains a suspension of a triglyceride hardstock constituent in particulate form. The hardstock constituent usually amounts to from about 0.5% to about 15% by weight of the fat, preferably from about 2% to about 5% by weight. The hardstock constituents comprises substantially fully hydrogenated normally solid fatty triglycerides, and optionally a normally solid fatty emulsifier. The hardstock constituent ordinarily has an iodine value of less than about 15, preferably it has an iodine value ranging from about 1 to about 12. The normally solid fatty triglycerides in the hardstock constituent ordinarily contain in each of their fatty acid moieties from 12 to 22 carbon atoms. The hardstock normally has a particle size in the range of from about 3 to about 100 microns to allow the fat to have a stable liquid or fluid state.

Various additives can be used in the cooking fats of this invention as minor components consistent with the ultimate end use, which primarily comprises various types of frying or griddling. The compositions of this invention can normally contain optional amounts of flavorings, emulsifiers, anti-spattering agents, anti-foaming agents, antioxidants, and the like.

The oxyacids of phosphorus referred to herein include hypophosphorous acid, phosphorous acid, pyrophosphorous acid, hypophosphoric acid, orthophosphoric acid, pyrophosphoric acid, polyphosphoric acid, and metaphosphoric acid. The salts of the oxyacids of phosphorus effective as anti-sticking agents in the present invention comprise primarily inorganic salts represented by the formula MX, wherein M comprises an alkali metal, alkali earth metal, mixed alkali metal-other metal or ammonium, and X comprises an hypophosphate, orthophosphate, pyrophosphate, polyphosphate, metaphosphate, or other similar anions. Other salts of oxyacids of phosphorus which are capable of functioning in an equivalent manner are also included within the scope of the present invention. Such compounds can include phosphites, hypophosphites, and the like. However, the phosphate salts are preferred.

Particularly suitable alkali metal and alkali earth metals include sodium, potassium and calcium. The hypophosphate anion can be represented by the general structure $P_2O_6$. Examples of suitable hypophosphate salts include $Na_4P_2O_6.10H_2O$, $Na_3HP_2O_6.9H_2O$, $Na_2H_2P_2O_6.6H_2O$, $Ca_2P_2O_6.2H_2O$, $(NH_4)_2H_2P_2O_6$, and other similar salts.

All of the hydrogens in orthophosphoric acid are replaceable with metal ions. Therefore, many forms of the orthophosphates exist and can be used in the present invention. Examples of suitable compounds include, but are not limited to, the following. Sodium orthophosphates suitable for use in the present invention include $NaH_2PO_4$, $NaH_2PO_4.H_2O$, $NaH_2PO_4.2H_2O$, $2NaH_2PO_4.Na_2HPO_4.2H_2O$, $NaH_2PO_4.Na_2HPO_4$, $NaH_2PO_4.H_3PO_4$, $Na_2HPO_4$, $Na_2HPO_4.2H_2O$, $Na_2HPO_4.7H_2O$, $Na_2HPO_4.8H_2O$, $Na_2HPO_4.12H_2O$, $Na_3PO_4$, $Na_3PO_4.\frac{1}{2}H_2O$, $Na_3PO_4.6H_2O$, $Na_3PO_4.8H_2O$, $Na_3PO_4.10H_2O$, and $Na_3PO_4.12H_2O$. Potassium orthophosphates suitable for use in the present invention include $K_3PO_4$, $K_2PO_3.4H_2O$, $KH_5(PO_4)_2$, $KH_2PO_4$, $KH_2PO_4.2K_2HPO_4.H_2O$, $KH_2PO_4.3K_2HPO_4.2H_2O$, $K_2HPO_4$, $K_2HPO_4.3H_2O$, $K_2HPO_4.6H_2O$, $K_3HPO_4.3H_2O$, $K_3HPO_4.7H_2O$, and $K_3HPO_4.9H_2O$. Calcium phosphates which are useful herein include $Ca(PO_3)_2$, $Ca(H_2PO_4)_2$, $CaH_4(PO_4)_2.H_2O$, $Ca_8H_2(PO_4)_6.5H_2O$, $Ca_{10}(PO_4)_6(OH)_2$, $CaHPO_4$, $CaHPO_4.2H_2O$, $Ca_3(PO_4)_2$, and $Ca_5(PO_4)_3OH$.

Many orthophosphates contain two or more cations. Suitable alkali metal-other metal phosphates for use in the present invention include $NaAl_3H_{14}(PO_4)_8.4H_2O$ and $Na_3Al_2H_{15}(PO_4)_8$. Ammonium orthophosphates suitable for use in the present invention include $NH_4H_2PO_4$, $NH_4H_5(PO_4)_2.H_2O$, $NH_4H_5(PO_4)_2$, $NH_4H_2PO_4$, $(NH_4)_2HPO_4$, $2(NH_4)_2HPO_4.(NH_4)_3PO_4$, and $(NH_4)_3PO_4.3H_2O$.

The structure of the pyrophosphate anion consists of two $PO_4$ tetrahedra bridged by a mutual oxygen atom. The size of the central P—O—P angle varies with different metal pyrophosphates. Pyrophosphates have a great tendency to occur in polymorphic phases and this polymorphism may be due to three kinds of structure arrangements: (a) linear ions with P—O—P angle equal to 180°, (b) nonlinear ions with P—O—P angle of less than 180°, or (c) statistically linear ions derived from suitable arrangement of nonlinear ions. Examples of pyrophosphates that can be used in the present invention include, but are not limited to, the following. Sodium pyrophosphates $Na_4P_2O_7.10H_2O$, $Na_4P_2O_7$, $Na_3HP_2O_7.9H_2O$, $Na_3HP_2O_7.H_2O$, $Na_3HP_2O_7$, $Na_2H_2P_2O_7.6H_2O$, $Na_2H_2P_2O_7$, and $NaH_3P_2O_7$ can be used in the present invention. Potassium pyrophosphates include $K_4P_2O_7$, $K_4P_2O_7.H_2O$, $K_4P_2O_7.3H_2O$, $K_2H_2P_2O_7$, and $K_2H_2P_2O_7.\frac{1}{2}H_2O$. Calcium pyrophosphates, $Ca_2P_2O_7$, $Ca_2P_2O_7.5H_2O$, exist in several polymorphic states, many of which are useful in the present invention. Ammonium pyrophosphates useful herein include $(NH_4)_4P_2O_7$, $(NH_4)_4P_2O_7.H_2O$, $(NH_4)_3HP_2O_7$, $(NH_4)_3HP_2O_7.H_2O$, and $(NH_4)_2H_2P_2O_7$.

The polyphosphate anion may be represented by the general formula $P_3O_{10}$. Polyphosphates include tripolyphosphates, tetrapolyphosphates and other higher polyphosphates. Polyphosphates of sodium, potassium, calcium and ammonium are known and suitable for use in the present invention. Examples include $Na_5P_3O_{10}$, $K_5P_3O_{10}$, $Na_6(P_4O_{13})$, $(NH_4)_6P_4O_{13}.6H_2O$, $(NaPO_3)_3.6H_2O$, and $(KPO_3)_4.2H_2O$. Cyclic metaphosphates are also suitable for use in the present invention and include trimetaphosphates, tetrametaphosphates, and higher membered ring metaphosphates. Examples include $(NaPO_3)_3$, $(NaPO_3)_4$, $(NaPO_3)_6$, $(KPO_3)_6$, and the like.

Of the above salts effective as anti-sticking agents in the present invention the following are preferred: $NaH_2PO_4$, $NaH_2PO_4.H_2O$, $Na_2HPO_4$, $Na_3PO_4$, $CaH_4(PO_4)_2$, $CaHPO_4$, $Ca_3(PO_4)_2$, $Ca_5(PO_4)_3OH$, $KH_2PO_4$, $NH_4H_2PO_4$, $Na_4P_2O_7$, $Na_3HP_2O_7$, $Na_3Al_2H_{15}(PO_4)_8$, and $(NaPO_3)_6$.

To be effective as an anti-sticking agent the salt must be present in an amount of at least 0.001% by weight of the fat composition. Preferably the phosphate salt is present in an amount of from about 0.01% to about 0.5% by weight of the composition.

The salt can be added to the fat composition as a solution, as a particulate, or formed in-situ. Heating a small amount of the fat composition in an oven at about 150° F. (66° C.) for about 30 minutes aids in dispersing particulate salts prior to diluting in the remainder of the fat composition. Particle size can possibly affect anti-sticking performance for some salts, and size should be optimized for a specific composition.

The salt can be formed in-situ by adding appropriate reactants to the fat composition, for example, an oxyacid of phosphorous and an alkali, alkali metal, or ammonium compound. Preferred oxyacids include orthophosphoric acid, pyrophosphoric acid, polyphosphoric acid, or metaphosphoric acid, Preferably the oxyacid is heated with a carbonate or bicarbonate of sodium, potassium, calcium, or ammonium. Other appropriate reactants within the skill of the art can be employed if chosen to prevent the formation of byproducts detrimental to the properties of the fat composition.

Additionally, this invention comprises a method for reducing sticking of food during cooking, particularly frying or grilling. This is accomplished by using an improved fat containing up to about 99.999% of edible triglycerides having saturated or unsaturated $C_{12}$ to $C_{22}$ fatty acid moieties and at least 0.001% by weight of a salt of an oxyacid of phosphorus, or mixtures thereof, as an anti-sticking agent. Preferably, the fat composition contains from about 0.5% to about 15% by weight of a triglyceride hardstock as an additional component having an iodine value ranging from about 1 to about 12. The anti-sticking agent is a salt of an oxyacid of phosphorus, or mixtures thereof, having the formula MX, wherein M comprises an alkali metal, alkali earth metal, mixed alkali-other metal, or ammonium, and X comprises an hypophosphate, orthophosphate, pyrophosphate, polyphosphate, metaphosphate, or similar anion. Lecithin at reduced levels can also be present, but the improvement in color and flavor will be less than if lecithin is not used.

It can be appreciated that still other executions of this invention can be devised without departing from its scope and spirit and without losing its advantages. In particular, the use of salts of the oxyacids of phosphorus as anti-sticking agents in fat compositions as a substitute for lecithin, or in combination with lecithin, however practiced, results in an improved fat with decreased thermal darkening and off-flavor development during use.

Kettle Browning Test Method

Comparison of fat composition discoloration in all compositions was via a standard kettle browning test method. A kettle was filled with liquid oil at a specified level, heated, and maintained at 350° F. (177° C.). Four hundred grams of the composition to be tested were placed into each of four beakers. The beakers were placed in a rack on top of the kettle in a manner such that they were predominantly immersed in the oil contained within the kettle. A thermometer was placed in each beaker. The compositions were heated to 340° F. (171° C.). The compositions were then sampled and the absorbance measured for each using a spectrophotometer. Reference compositions were tested in the same manner. Reference samples comprised the fat composition being tested with no lecithin component or with an untreated lecithin component present at the same concentration as in the test sample. Absorbance readings for each test and reference composition were obtained on a Varian Series 634 U.V.—Visible Spectrophotometer set at a wavelength of 534 nm. at periodic time intervals after continuous heating of the samples. Test samples containing solids resulted in inaccurate absorbance readings. When this occurred, samples were heated to a higher temperature to dissolve the solids, or alternatively, samples and reference compositions were filtered and reheated prior to measuring their absorbance.

Pan-Sticking Test

A pan-sticking test was employed to determine the anti-sticking performance of fats when used for pan frying. The fat to be tested was first heated to 125° F. (52° C.) in a constant temperature bath. A gas stove equipped with a gas flow meter was employed. After lighting the flame the gas flow was adjusted to 3.5 standard cubic feet per hour. Eggs were warmed to room temperature and cracked into 400 ml. beakers, one egg per beaker. The frying pan was seasoned by placing 400 g. of fat into the pan and heating on the stove for ten minutes. The fat was then discarded and the pan wiped with a paper towel. The pan was returned to the flame and preheated to 400° F. (204° C.). The pan interior was then coated quickly with 2 cc. of the fat. The egg was added and cooked for 1 minute and 10 seconds. The pan was removed from the flame and tilted at a 90° angle to grade sticking performance according to the following scale. The pan was wiped with a paper towel to remove any stuck egg and residual oil. The test was then repeated 10 times for each fat sample beginning at the point of preheating the pan to 400° F. (204° C.).

| Pan Sticking Test Grading Scale | | |
|---|---|---|
| Grade | % Sticking | Amount of Force |
| 10 | 0 | Tilt of the pan |
| 9 | 1–5 | Tilt of the pan |
| 8 | 6–10 | Tilt of the pan |
| 9 | 0 | Two shakes with the pan at 90° |
| 8 | 1–5 | Two shakes with the pan at 90° |
| 7 | 6–10 | Two shakes with the pan at 90° |
| 6 | 11–20 | Two shakes with the pan at 90° |
| 8 | 0 | Pan upside down for 5 sec. |
| 7 | 1–5 | Pan upside down for 5 sec. |
| 6 | 5–10 | Pan upside down for 5 sec. |
| 7 | 1–5 | Stuck surface must be loosened with a spatula |
| 6 | 5–10 | Stuck surface must be loosened with a spatula |
| 5 | 11–20 | Stuck surface must be loosened with a spatula |
| 4 | 21–30 | Stuck surface must be loosened with a spatula |
| 3 | 31–50 | Stuck surface must be loosened with a spatula |
| 2 | 51–75 | Stuck surface must be loosened with a spatula |
| 1 | 76–100 | Stuck surface must be loosened with a spatula |

The following embodiments illustrate the practice of this invention, but are not intended to limit it. All percentages are by weight unless otherwise specified. The designation "ppm" is used herein to mean parts per million as micrograms per gram.

EXAMPLE 1

Example 1 illustrates that phosphate salts formed in situ are effective as anti-sticking agents.

Various amounts of lecithin, a 22% solution of sodium carbonate ($Na_2CO_3$), and a 70% solution of orthophosphoric acid ($H_3PO_4$) as shown in Table I were added to a fluid vegetable shortening containing trace amounts of coconut oil, carotene, and flavors. The shortening comprised primarily triglycerides having $C_{12}$ to $C_{22}$ fatty acid moieties and contained from about 0.5% to about 15% by weight of a suspension of triglyceride hardstock in particulate form. A sample of the shortening containing no added lecithin, sodium carbonate, or orthophosphoric acid was employed as a reference. The samples were heated in an oven for about 30 minutes at about 150° F. (66° C.) and were then filtered. The filtrates were subjected to the pan-sticking test previously described. As shown in Table I, the compositions containing both $Na_2CO_3$ and $H_3PO_4$ had higher sticking grades than those with only lecithin or lecithin plus $Na_2CO_3$. The above procedure was repeated using the same shortening with no added lecithin, and with various amounts of added $Na_2CO_3$ and $H_3PO_4$, as shown in Table I. No filtration step was performed on these samples. Again, the compositions containing both $Na_2CO_3$ and $H_3PO_4$ had higher sticking grades than those containing no additives or only $Na_2CO_3$.

TABLE I

| | Fat Additives | | | Sticking |
|---|---|---|---|---|
| | Lecithin, % | $Na_2CO_3$, % | $H_3PO_4$, % | Grade |
| I. | 0.4 | 0 | 0 | 8.0 |
| | 0.4 | 0.05 | 0 | 8.3 |
| | 0.4 | 0.05 | 0.003 | 9.2 |
| II. | 0 | 0 | 0 | 6.2 |
| | 0 | 0.01 | 0 | 4.6 |
| | 0 | 0.01 | 0.006 | 8.4 |
| | 0 | 0.02 | 0.012 | 7.4 |

EXAMPLE 2

Calcium phosphate in the concentrations shown on Table II was added with mixing to 3600 grams of the fluid vegetable shortening of Example 1. A sample of the shortening with no added salt was employed as a reference. Samples containing added salt and containing 0.06% and 0.09% lecithin were also tested. All samples were heated in an oven for about 30 minutes at about 150° F. (66° C.). The samples were subjected to the pan-sticking test previously described. The lecithin-containing samples and one of the salt-containing samples were subjected to the kettle browning test previously described. The resulting data are summarized in Table II. The samples containing calcium phosphate as an anti-sticking agent had sticking grades comparable to the samples containing lecithin. The phosphate salt samples were much lower in color intensity than the lecithin samples as shown by the lower absorbance reading.

TABLE II

| Anti-Sticking Agent | Level | pH | Particle Size | Absorbance 4 Hours | Sticking Grade |
|---|---|---|---|---|---|
| None | | | | | 6.2 |
| Calcium Phosphate | 100 ppm | 4.5 | Coarse | | 7.9 |
| | 100 ppm | | Fine | | 8.5 |
| $CaH_4(PO_4)_2 \cdot H_2O$ | 250 ppm | | Coarse | | 8.1 |
| $CaHPO_4$ | 100 ppm | 7.5 | Coarse | | 7.5 |
| $Ca_3(PO_4)_2$ | 100 ppm | | Fine | .01 | 8.7 |
| | 50 ppm | | Fine | | 8.6 |
| | 250 ppm | | Fine | | 8.3 |
| $Ca_3(PO_4)_2$ + 0.06% Lecithin | 100 ppm | | Fine | .04 | 8.7 |
| $Ca_3(PO_4)_2$ + 0.09% Lecithin | 100 ppm | | Fine | .08 | 7.6 |

EXAMPLE 3

Sodium phosphate in the amounts shown in Table III was added with mixing to 3600 grams of the fluid vegetable shortening of Example 1. The samples were treated as in Example 2 and subjected to the pan-sticking test previously described. The resulting data are summarized in Table III.

TABLE III

| Anti-Sticking Agent | Level | pH | Physical Form | Sticking Grade |
|---|---|---|---|---|
| None | | | | 6.2 |
| Sodium Phosphate NaH$_2$PO$_4$.H$_2$O | 100 ppm | 4.3 | 22% Soln | 5.5 |
| | | | — | 7.2 |
| Na$_2$HPO$_4$ | 100 ppm | 9.1 | 22% Soln | 8.1 |
| | 250 ppm | | 42% Soln | 7.8 |
| Na$_3$PO$_4$ | 50 ppm | 11.8 | Coarse | 8.4 |
| | 100 ppm | | Coarse | 7.9 |
| | 100 ppm | | Fine | 8.1 |
| | 100 ppm | | 22% Soln | 7.9 |
| | 250 ppm | | Coarse | 5.8 |

EXAMPLE 4

Potassium phosphate, ammonium phosphate, and sodium aluminum phosphate, at a level of 100 ppm each, were added with mixing to the shortening composition of Example 1. The samples were treated as in Example 2 and subjected to the pan-sticking test previously described. The resulting data are summarized in Table IV.

TABLE IV

| Anti-Sticking Agent | Level | pH | Physical Form | Sticking Grade |
|---|---|---|---|---|
| None | | | | 6.2 |
| Potassium Phosphate KH$_2$PO$_4$ | 100 ppm | 4.6 | 22% Soln | 5.6 |
| | 100 ppm | | Coarse | 8.3 |
| | 100 ppm | | Fine | 7.6 |
| Ammonium Phosphate NH$_4$H$_2$PO$_4$ | 100 ppm | 4.4 | 22% Soln | 6.9 |
| | 100 ppm | | Coarse | 8.1 |
| | 100 ppm | | Fine | 6.9 |
| Sodium Aluminum Phosphate | 100 ppm | 2.4 | Coarse | 7.6 |

EXAMPLE 5

Sodium pyrophosphate and sodium hexametaphosphate in the amounts shown in Table V were added with mixing to the shortening composition of Example 1. The samples were treated as in Example 2 and subjected to the pan-sticking test previously described. The resulting data are summarized in Table V.

TABLE V

| Anti-Sticking Agent | Level | pH | Particle Size | Absorbance 4 Hours | Sticking Grade |
|---|---|---|---|---|---|
| None | | | | | 6.2 |
| Sodium pyrophosphate | 50 ppm | 13.1 | 22% Soln | | 7.8 |
| | 50 ppm | | 15% Soln | .002 | 8.7 |
| | 100 ppm | | Coarse | | 6.9 |
| | 100 ppm | | 22% Soln | .008 | 8.8 |
| | 100 ppm | | Fine | .006 | 7.8 |
| | 250 ppm | | 22% Soln | | 6.8 |
| Sodium pyrophosphate (100 ppm) + .06% lecithin | | | 22% Soln | .027 | 9.0 |
| Sodium acid pyrophosphate | 50 ppm | 4.2 | Fine | | 7.8 |
| | 100 ppm | | Fine | | 8.2 |
| | 250 ppm | | Fine | | 6.9 |
| Sodium hexametaphosphate | 100 ppm | — | 22% Soln | | 7.7 |
| | 100 ppm | | Coarse | | 7.5 |
| | 250 ppm | | Fine | | 7.6 |
| | 1250 ppm | | Fine | | 7.9 |

EXAMPLE 6

The shortening composition disclosed in U.S. Pat. No. 3,355,302 of Purves, Going, and Dobson, issued Nov. 28, 1967, was prepared containing 0.5% by weight Tween 60 and sodium hexametaphosphate at the level shown in Table VI. No lecithin was present. The compositions were tested using the pan-sticking and kettle-browning tests previously described. The resulting data are summarized in Table VI. No appreciable product browning was observed. The pan-sticking values demonstrate that the sodium hexametaphosphate did not function as an anti-sticking agent in this composition. It is hypothesized that the polyoxyethylene ethers of sorbitan partial esters (Tweens) possibly interfere with the anti-sticking function. Each pan-sticking value represents an average of 20 eggs tested.

TABLE VI

| Composition | Absorbance 4 Hours | Sticking Grade |
|---|---|---|
| Fat + Tween 60 | 0.0 | 7.9 |
| Fat + Tween 60 + 100 ppm Na Hexametaphosphate | 0.0 | 8.6 |
| Fat + Tween 60 + 250 ppm Na Hexametaphosphate | 0.002 | 7.1 |
| Fat + Tween 60 + 2500 ppm Na Hexametaphosphate | 0.0 | 7.0 |

EXAMPLE 7

Example 7 illustrates that (1) the flavor of shortening containing a phosphate salt as an anti-sticking agent is equivalent to the same shortening containing lecithin, and (2) off-flavor development upon heating for shortening containing a phosphate salt as an anti-sticking agent is less than for the same shortening containing lecithin as an anti-sticking agent.

Various amounts of lecithin, sodium pyrophosphate and tribasic calcium phosphate, as shown in Table VII, were added to the shortening composition of Example 1. The sample containing lecithin was used as a standard and assigned a value of 10. The other compositions were evaluated by taste panels for both fresh flavor and off-flavor compared to the standard. The scale for evaluation was as follows: 10=identical to standard, 9=not different, 8=slightly different, 7=different, and 6=very different. A + or − was then assigned to indicate better or worse flavor. A + indicated better flavor than the standard and a − indicated worse flavor than the standard. Samples were compared on a fresh basis and the resulting data are summarized in Table VII-A. The fresh flavor grades for shortenings containing phosphate salts are comparable to that for the shortening containing lecithin indicating that the salts did not affect fresh flavor. The samples were then evaluated after browning for 4 hours at 270° F. (132° C.). The shortening containing lecithin, which is known to develop off-flavor, was assigned a value of 10. The other samples were compared to it using the scale described above for degrees of differences and a + or − to indicate better or worse flavor, respectively, than the standard. The resulting data are summarized in Table VII-B. The browned flavor grades indicated a difference in flavor. The + indicated the shortenings containing phosphate salts had better flavor than the standard, and therefore that the salts decreased off-flavor. A greater difference in grades corresponded to a greater improvement in flavor.

TABLE VII-A

| Anti-sticking Agent | Level | Fresh Flavor Grade | Flavor Difference |
|---|---|---|---|
| Lecithin | 625 ppm | 10.0 | |
| Sodium pyrophosphate | 100 ppm | 9.8 | 0.2 |
| Lecithin + Sodium pyrophosphate | 625 ppm 100 ppm | 9.8 | 0.2 |
| Calcium phosphate, Ca$_3$(PO$_4$)$_2$ | 100 ppm | 10.0 | |
| Lecithin + Calcium phosphate, Ca$_3$(PO$_4$)$_2$ | 625 ppm 100 ppm | 9.8 | 0.2 |

TABLE VII-B

| Anti-sticking Agent | Level | Browned Flavor Grade | Flavor Difference |
|---|---|---|---|
| Lecithin | 625 ppm | 10.0 | |
| Sodium pyrophosphate | 100 ppm | +8.1 | 1.9 |
| Lecithin + Sodium pyrophosphate | 625 ppm 100 ppm | +8.3 | 1.7 |
| Calcium phosphate, Ca$_3$(PO$_4$)$_2$ | 100 ppm | +9.0 | 1.0 |
| Lecithin + Calcium phosphate, Ca$_3$(PO$_4$)$_2$ | 625 ppm 100 ppm | +9.0 | 1.0 |

What is claimed is:

1. A cooking fat composition which is free of polyoxyethylene ethers of sorbitan partial esters and which comprises:
   (a) a major amount of edible triglycerides having saturated or unsaturated $C_{12}$ to $C_{22}$ fatty acid moieties; and
   (b) an anti-sticking agent in an amount effective to reduce sticking tendencies during cooking, comprising a salt of an oxyacid of phosphorus of formula MX wherein M comprises an alkali metal, alkali earth metal, mixed alkali metal-other metal, or ammonium and wherein X comprises an hypophosphate, orthophosphate, pyrophosphate, polyphosphate, or metaphosphate.

2. The composition of claim 1 wherein the edible triglycerides are present in an amount up to about 99.999% by weight of the composition.

3. The composition of claim 2 wherein the edible triglycerides comprise soybean oil.

4. The composition of claim 2 wherein the triglycerides further comprise a suspension of from about 0.5% to about 15% by weight of the composition of a triglyceride hardstock.

5. The composition of claim 4 wherein the triglyceride hardstock is present in an amount of from about 2% to about 5% by weight of the composition.

6. The composition of claim 4 wherein the triglyceride hardstock has an iodine value ranging from about 1 to about 12.

7. The composition of claim 1 wherein the salt of an oxyacid of phosphorus is present in an amount at least 0.001% by weight of the composition.

8. The composition of claim 7 wherein the salt is present in an amount of from about 0.001% to about 0.5% by weight of the composition.

9. The composition of claim 7 wherein the phosphate salt is selected from the group consisting of ammonium phosphate, calcium phosphate, potassium phosphate, sodium phosphate, sodium pyrophosphate, sodium acid pyrophosphate, sodium hexametaphosphate and sodium aluminum phosphate.

10. A cooking fat composition which is free of polyoxyethylene ethers of sorbitan partial esters and which comprises:
    (a) up to about 99.999% by weight of edible triglycerides having saturated or unsaturated $C_{12}$ to $C_{22}$ fatty acid moieties containing a suspension of triglyceride hardstock of from about 0.5% to about 15% by weight of the composition;
    (b) from about 0.001% to about 0.5% by weight of a phosphate salt as an anti-sticking agent; and
    (c) components selected from the group consisting of flavorings, anti-foaming agents, and antioxidants.

11. The composition of claim 10 wherein the phosphate salt is selected from the group consisting of ammonium phosphate, calcium phosphate, potassium phosphate, sodium phosphate, sodium pyrophosphate, sodium acid pyrophosphate, sodium hexametaphosphate and sodium aluminum phosphate.

12. A process for cooking food which comprises the step of cooking the food with a fat free of polyoxyethylene ethers of sorbitan partial esters and containing a major amount of edible triglycerides and at least 0.001% by weight of a salt of an oxyacid of phosphorus as an anti-sticking agent.

13. The process of claim 12 wherein the edible triglycerides are present in an amount of up to about 99.999% by weight of the composition.

14. The process of claim 13 wherein the edible triglycerides comprise soybean oil.

15. The process of claim 14 wherein the triglyceride further comprises a suspension of from about 0.5% to about 15% by weight of a triglyceride hardstock.

16. The process of claim 15 wherein the triglyceride hardstock is present in an amount of from about 2% to about 5% by weight of the composition.

17. The process of claim 16 wherein the triglyceride hardstock has an iodine value ranging from about 1 to about 12.

18. The process of claim 15 wherein the salt of an oxyacid of phosphorus is present in an amount of from about 0.001% to about 0.5% by weight of the composition.

19. The process of claim 18 wherein the salt comprises an inorganic salt of formula MX wherein M comprises an alkali metal, alkali earth metal, mixed alkali metal-other metal, or ammonium and wherein X comprises an hypophosphate, orthophosphate, pyrophosphate, polyphosphate, or metaphosphate salt.

20. The process of claim 19 wherein the phosphate salt is selected from the group consisting of ammonium phosphate, calcium phosphate, potassium phosphate, sodium phosphate, sodium pyrophosphate, sodium acid pyrophosphate, sodium hexametaphosphate and sodium aluminum phosphate.

21. A process for cooking food which comprises the step of cooking the food with a fat free of polyoxyethylene ethers of sorbitan partial esters and containing:
   (a) up to about 99.999% by weight of edible triglycerides having saturated or unsaturated $C_{12}$ to $C_{22}$ fatty acid moieties containing a suspension of triglyceride hardstock of from about 0.5% to about 15% by weight of the composition;
   (b) from about 0.001% to about 0.5% by weight of a salt of an oxyacid of phosphorus as an anti-sticking agent; and
   (c) components selected from the group consisting of flavorings, anti-foaming agents, and antioxidants.

22. A cooking fat composition comprising:
   (a) up to about 99.999% by weight of edible triglycerides having saturated or unsaturated $C_{12}$ to $C_{22}$ fatty acid moieties containing a suspension of triglyceride hardstock of from about 0.5% to about 15% by weight of the composition;
   (b) from about 0.001% to about 0.5% by weight of a calcium phosphate as an anti-sticking agent; and
   (c) a minor amount of an anti-foaming agent.

23. The composition of claim 22 wherein said calcium phosphate is selected from the group consisting of $Ca(PO_3)_2$, $Ca(H_2PO_4)_2$, $Ca(PO_4)_2$, $Ca(PO_4)_2 \cdot H_2O$, $Ca_8H_2(PO_4)_6 \cdot 5H_2O$, $Ca_{10}(PO_4)_6(OH)_2$, $CaHPO_4$, $CaHPO_4 \cdot 2H_2O$, $Ca_3(PO_4)_2$, $Ca_5(PO_4)_3OH$, $CaP_2O_7$ and $Ca_2P_2O_7 \cdot 5H_2O$.

24. A process for cooking food which comprises the steps of cooking the food with a fat containing:
   (a) up to about 99.999% by weight of edible triglycerides having saturated or unsaturated $C_{12}$ to $C_{22}$ fatty acid moieties containing a suspension of triglyceride hardstock of from about 0.5% to about 15% by weight of the composition;
   (b) from about 0.001% to about 0.5% by weight of a calcium phosphate as an anti-sticking agent; and
   (c) a minor amount of an anti-foaming agent.

25. The process of claim 24 wherein the calcium phosphate is selected from the group consisting of $Ca(PO_3)_2$, $Ca(H_2PO_4)_2$, $Ca(PO_4)_2 \cdot H_2O$, $Ca_8H_2(PO_4)_6 \cdot 5H_2O$, $Ca_{10}(PO_4)_6(OH)_2$, $CaHPO_4$, $CaHPO_4 \cdot 2H_2O$, $Ca_3(PO_4)_2$, $Ca_5(PO_4)_3OH$, $CaP_2O_7$ and $Ca_2P_2O_7 \cdot 5H_2O$.

* * * * *